US011007867B2

(12) United States Patent
Loffink

(10) Patent No.: US 11,007,867 B2
(45) Date of Patent: May 18, 2021

(54) TUBE SUPPORT ASSEMBLY

(71) Applicant: John Loffink, Damascus, OR (US)

(72) Inventor: John Loffink, Damascus, OR (US)

( * ) Notice: Subject to any disclaimer, the term of this patent is extended or adjusted under 35 U.S.C. 154(b) by 85 days.

(21) Appl. No.: 15/957,734

(22) Filed: Apr. 19, 2018

(65) Prior Publication Data
US 2018/0312054 A1 Nov. 1, 2018

Related U.S. Application Data

(62) Division of application No. 15/018,495, filed on Feb. 8, 2016, now Pat. No. 10,112,477.

(60) Provisional application No. 62/115,811, filed on Feb. 13, 2015.

(51) Int. Cl.
*B60K 15/03* (2006.01)
*B60K 15/01* (2006.01)

(52) U.S. Cl.
CPC .............. *B60K 15/03* (2013.01); *B60K 15/01* (2013.01); *B60K 2015/03032* (2013.01); *B60K 2015/03453* (2013.01)

(58) Field of Classification Search
CPC ........ B60K 15/03–03006; B60K 15/01; B60K 15/013; B60K 2015/016; B65D 2015/03335; B65D 2015/03381; B65D 2015/03421; B65D 2015/03447; B65D 2015/03453
See application file for complete search history.

(56) References Cited

U.S. PATENT DOCUMENTS

| | | | | |
|---|---|---|---|---|
| 2,125,674 A | * | 8/1938 | Gould | B60K 15/061 137/389 |
| 2,870,786 A | * | 1/1959 | Schroeder | F15B 1/26 137/587 |
| 3,500,858 A | * | 3/1970 | Metcalf | B60K 15/00 137/560 |
| 4,763,633 A | * | 8/1988 | Nakanishi | F02M 37/0017 123/198 D |
| 4,920,936 A | * | 5/1990 | Slattery | F01M 11/00 123/196 S |
| 5,056,489 A | * | 10/1991 | Lorraine | F02M 69/465 123/468 |
| 5,056,492 A | * | 10/1991 | Banse | B60K 15/01 123/509 |
| 5,533,486 A | * | 7/1996 | Qutub | F02D 33/006 123/514 |
| 6,161,562 A | * | 12/2000 | Keefer | F02M 37/0017 123/469 |
| 6,273,118 B1 | * | 8/2001 | Watson | F02M 37/0017 123/469 |
| 6,273,123 B1 | * | 8/2001 | Keefer | F02M 37/0017 123/469 |
| 6,932,061 B2 | * | 8/2005 | Tsuruta | B60K 15/00 123/468 |
| 8,752,568 B2 | * | 6/2014 | Keefer | F16L 13/0209 123/469 |

(Continued)

Primary Examiner — Kareen K Thomas
(74) Attorney, Agent, or Firm — Ingrid McTaggart

(57) ABSTRACT

A fuel tank assembly includes a securement structure that may be secured to a fuel tank. The securement structure may stabilize the lower regions of a draw tube and a return tube positioned within the fuel tank such that movement and vibration of the draw and return tubes is reduced during motion of the vehicle to which the fuel tank is secured.

14 Claims, 6 Drawing Sheets

(56) References Cited

U.S. PATENT DOCUMENTS

| | | | |
|---|---|---|---|
| 9,062,438 B2 * | 6/2015 | Bares | E03C 1/04 |
| 9,914,558 B2 * | 3/2018 | Watson | B60K 15/01 |
| 2007/0157454 A1 * | 7/2007 | Keefer | F16L 13/0209 |
| | | | 29/525.13 |
| 2009/0301590 A1 * | 12/2009 | Waymire | F02M 37/0023 |
| | | | 137/627.5 |
| 2014/0110416 A1 * | 4/2014 | Watson | B60K 15/01 |
| | | | 220/601 |
| 2015/0007899 A1 * | 1/2015 | Ekstam | F02M 37/0076 |
| | | | 137/590 |

* cited by examiner

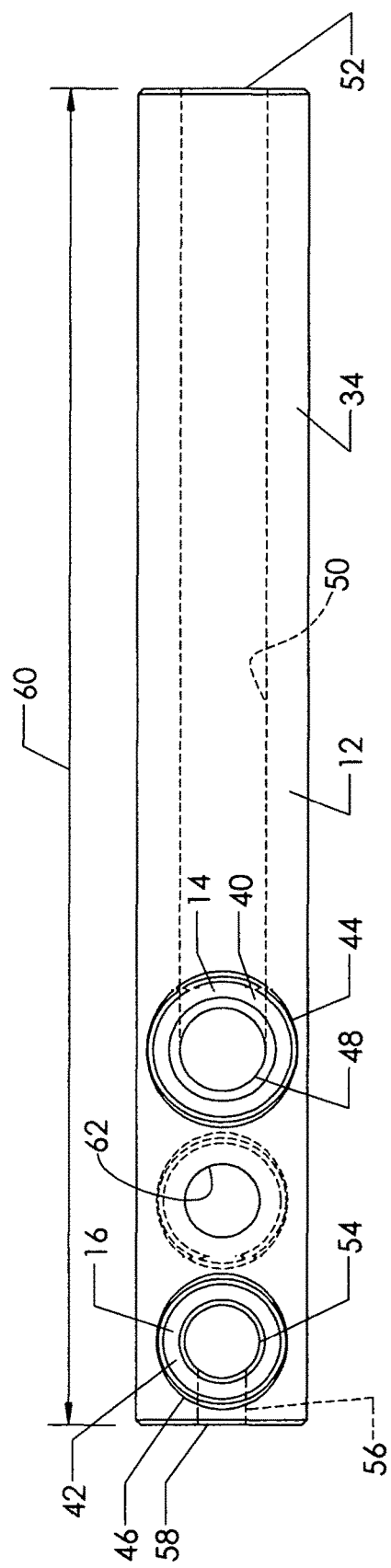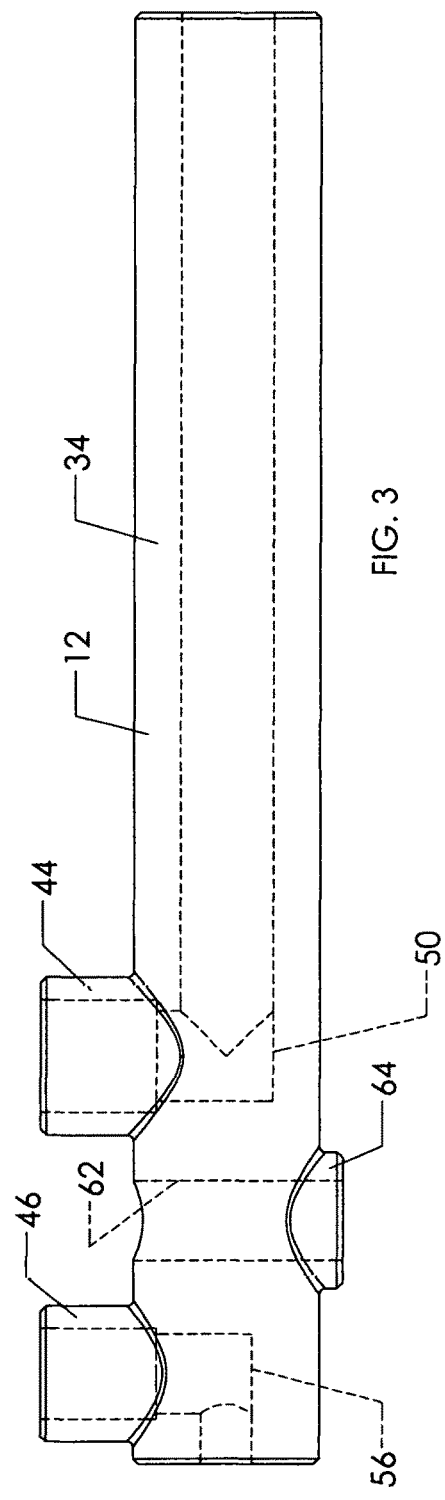

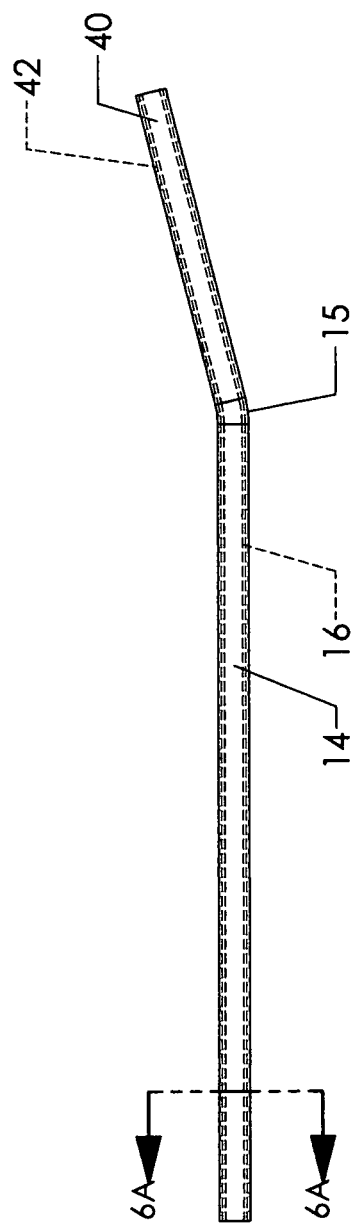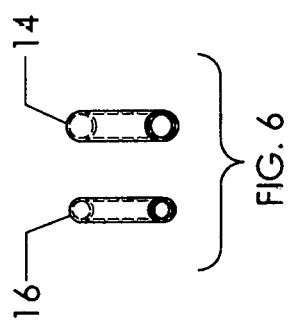

US 11,007,867 B2

TUBE SUPPORT ASSEMBLY

This application claims the benefit of U.S. provisional patent application filed on Feb. 13, 2015, having patent application No. 62/115,811, in the name of inventor John Loffink, and entitled TUBE SUPPORT ASSEMBLY, and is a Divisional application of U.S. patent application Ser. No. 15/018,495 filed on Feb. 8, 2016, in the name of inventor John Loffink, and entitled TUBE SUPPORT ASSEMBLY.

1. TECHNICAL FIELD

The present invention relates to a fuel tank assembly, and a process of manufacturing the same, for use in commercial vehicles, and more particularly, to a fuel tank assembly that provides securement of a lower end of a draw tube and a return tube to a lower interior surface of a fuel tank such that during use of the vehicle draw and return tube movement and vibration is reduced.

2. BACKGROUND OF THE INVENTION

Prior art fuel tanks typically include draw and return tubes secured at their upper end to the upper surface of a fuel tank. During motion of the vehicle the lower end of the draw and return tubes may be subject to movement and/or vibration which may damage the fuel tank or the tubes themselves, and which may damage or loosen securement of the top end of the draw and return tubes at the upper surface of the fuel tank.

SUMMARY OF THE INVENTION

The present invention provides a fuel tank assembly, and a process of manufacturing the same, that overcomes the disadvantages of the prior art. One aspect of the present invention provides a fuel tank securement structure that secures a lower end of a fuel draw tube and fuel return tube to a lower interior surface of a fuel tank by utilizing a drain aperture of the fuel tank.

BRIEF DESCRIPTION OF THE DRAWINGS

FIG. 2 is a plan view of the securement structure of FIG. 1.

FIG. 3 is a side view of the securement structure of FIG. 1.

FIG. 6 is a cross sectional plan view of the draw and return tubes unsecured to a securement structure or to a flange.

FIG. 7 is a side view of a draw tube of FIG. 1 unsecured to a securement structure or to a flange.

DETAILED DESCRIPTION OF THE PREFERRED EMBODIMENTS

The invention discloses a fuel tank assembly that allows a draw and a return tube to be secured at their lower end within a fuel tank, thereby reducing movement and vibration of the fuel tubes during use of a vehicle on which the tubes are mounted. The assembly may be secured within a drain aperture of a fuel tank which may allow the assembly to be secured within fuel tank that is already installed on a commercial vehicle.

Figure 1:
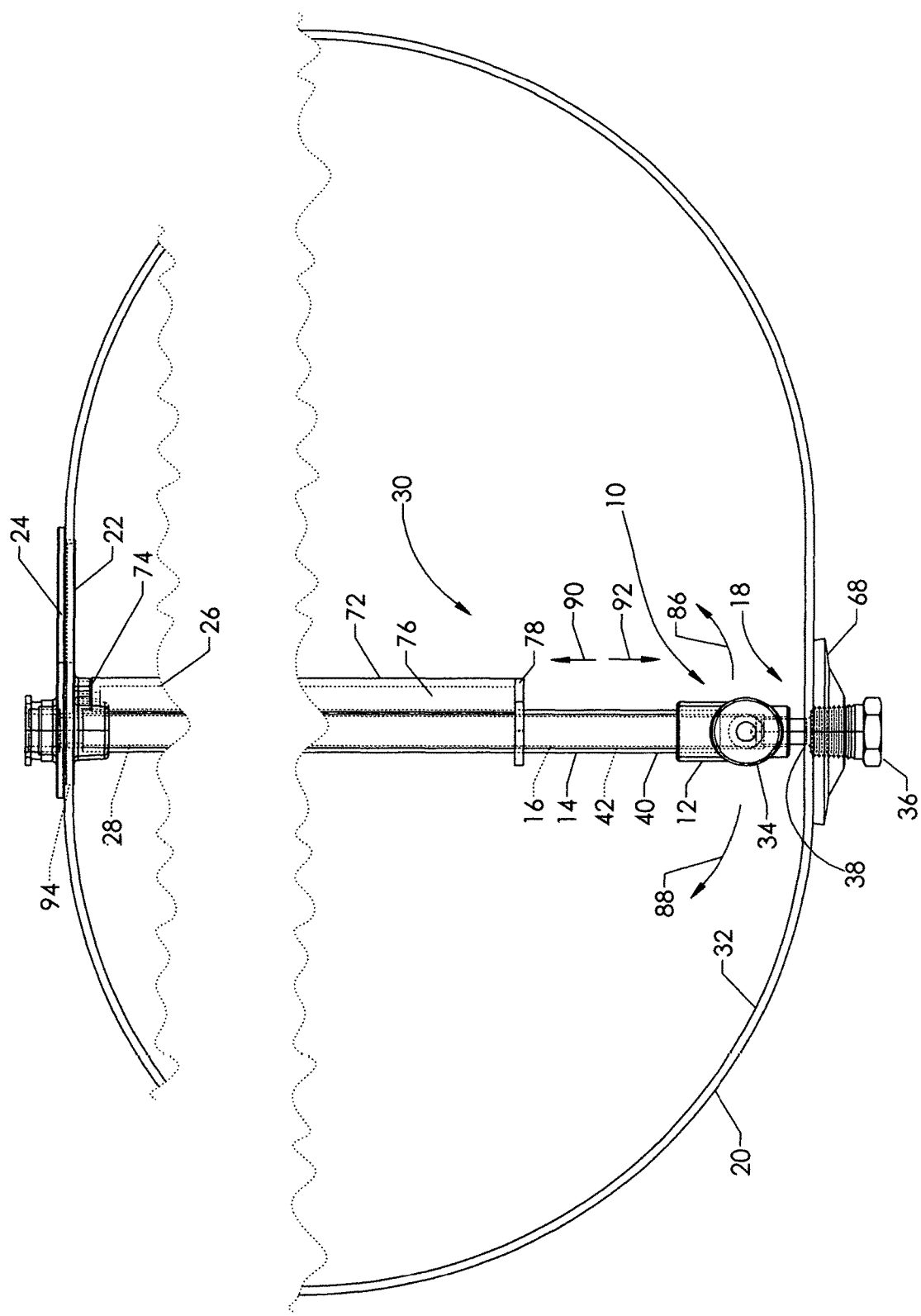
FIG. 1 is a side cross sectional view of one example embodiment of the assembly of the present invention including a securement structure securing a draw tube and a fuel tube to a lower region of a fuel tank.

FIG. 1 is a side cross sectional view of one example embodiment of the assembly 10 of the present invention including a securement structure 12 securing a draw fuel tube 14 and a return fuel tube 16 to a lower region 18 of a fuel tank 20. Fuel tank 20 includes an upper surface 22 that may include a flange 24 secured thereto, wherein upper regions 26 and 28 of the draw and return tubes 14 and 16 may be secured to the flange or to the upper surface of the fuel tank. An interior 30 of the fuel tank 20 may be defined by upper surface 22 and a lower surface 32 of the fuel tank. Fuel tank 30 may have a generally round cross sectional shape as shown, but may also be formed in any shape or size as desired.

Securement structure 12 may include an elongate member 34 such as a tube and a fastener 36 positioned through an aperture 38 in fuel tank 20. Aperture 38 may be a drain aperture used to drain the fuel tank 20 when desired. Fastener 36 may be positioned through drain aperture 38 and then secured within elongate member 34 to secure the elongate member to fuel tank 20 and thereby secure lower regions 40 and 42 of corresponding fuel tubes 14 and 16 to lower surface 32 of the fuel tank 20.

FIGS. 2 and 3 are a plan view and a side view, respectively, of the securement structure 12 of FIG. 1. Structure 12 includes elongate member, or a tube, 34 having a first projection 44 for receiving lower region 40 of draw tube 14 and a second projection 46 for receiving lower region 42 of return tube 16. First projection 44 may include a fluid flow path 48 that communicates with a first fluid flow path 50 through tube 34, and which terminates in a fluid exit and/or entrance aperture 52. Second projection 46 may include a fluid flow path 54 that communicates with a second fluid flow path 56 through tube 34, and which terminates in a fluid exit and/or entrance aperture 58. Fluid apertures 52 and 58 may be positioned on opposite ends of tube 34 and spaced apart by a length 60 of tube 34, such as eight inches in the embodiment shown, such that warm fuel returned to fuel tank 20 through aperture 58 is not returned to fuel tank 20 adjacent to fuel drawn from tank 20 through aperture 52. In this manner, the entrance and/or exit of flow paths 50 and 56 are spaced a distance 60 from one another, without requiring bending of the ends of draw and return tubes and to space the ends from one another, as in prior art draw and return tube assemblies. Accordingly, securement structure 12 of the present invention allows for more time efficient and less costly manufacturing and installation of a fuel draw and return tube assembly.

Tube 34 further includes a fastener aperture 62 for receiving and securing fastener 36 therein so as to secure tube 34 to fuel tank 20. In particular, fastener 36, in one example embodiment, may comprise a bolt shape having a head region 37 (FIG. 5) having a diameter 37a that is larger than aperture 38 of fuel tank 20, and larger than a diameter 66a of threaded region 66 of the fastener, such that threaded region 66 of fastener 36 may pass through and be secured within mating threads of aperture 38 of fuel tank 20 or within mating threads of a flange 68 secured to fuel tank 20 (FIG. 1). Fastener 36 may further comprise an end region 70 that has a smaller diameter 70a than diameter 66a of threaded region 66, and is secured within aperture 62 of tube 34. Aperture 62 may be positioned between projections 44 and 46 so as to provide stability to tubes 14 and 16 (FIG. 1) when the tubes 14 and 16 are secured to tube 34. Tube 34 may further include a third projection 64, on an underside of tube 34 and opposite from projections 44 and 46, at fastener aperture 62 which may reduce movement of tube 34 with respect to fastener 36 when the tube 34 is secured to fuel tank 20.

In one example embodiment aperture 62 may include threads to secure a threaded region 70 of fastener 36 therein. In the embodiment shown, aperture 62 may have smooth internal sides and may receive the smooth sides of end region 70 of fastener 36 therein, wherein the length of tubes 14 and 16 extending from under surface 22 of fuel tank 20 to first and second projections 44 and 46 of tube 34, will function to retain tube 34 in place on fastener 36 at aperture 38 of lower surface 32 of fuel tank 20. Use of a fastener 36 have a smooth sided end region 70 that is received within a smooth sided aperture 62 of tube 34 may allow tube 34 to move slightly upwardly or downwardly along end region 70 during slight contraction or expansion of the size of fuel tank 20 due to a change in temperature or other operating conditions or during slight vibrations of the vehicle during use. Accordingly, the assembly 10 of the present invention may hinder tubes 14 and 16 from vibrating from side to side in directions 86 and 88 (FIG. 1) during use which may cause damage to the tubes, the flange or the fuel tank, yet assembly 10 may still allowing for slight movement of tube 34 upwardly or downwardly in directions 90 and 92 on end region 70 (FIG. 1) of fastener 36 during contraction or expansion of the fuel tank due to temperature variations. Moreover, the assembly 10 of the present invention may allow for retrofit securement of the lower regions 40 and 42 of tubes 14 and 16 inside the fuel tank by placement of fastener 36 through a drain aperture 38 of a fuel tank, without requiring additional apertures to be cut into the fuel tank 20.

Figure 4:
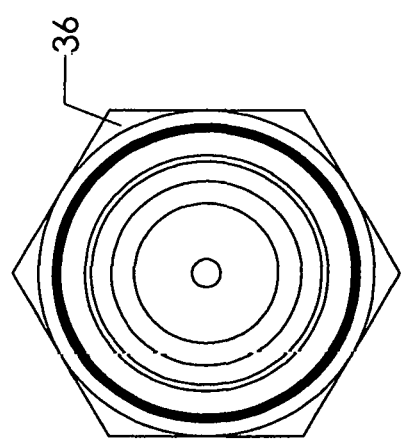
FIG. 4 is a plan view of a fastener for securing the securement structure of FIG. 2 to a fuel tank.

FIG. 4 is a plan view of a fastener 36 for securing the securement structure 12 of FIG. 2 to a fuel tank 20. Fastener 36 may include threads 66 which may be threadably received within flange 68 (FIG. 1) secured to fuel tank 20 around drain aperture 38. Fastener 36 may further include an end region 70 that is received within third projection 64 and fastener aperture 62 of securement structure 12. By utilizing drain aperture 38 to secure securement structure 12 within tank 20, the previously manufactured drain aperture may be used, rather than creating a new hole within fuel tank 20, which may help to ensure the integrity of the fuel tank 20 against further leaks. Additionally, use of drain aperture 38 to secure securement structure 12 may allow the assembly 10 of the present invention to be easily secured within a fuel tank 20 as a retrofit or after market accessory without alternation to the fuel tank 20 itself.

Figure 5:
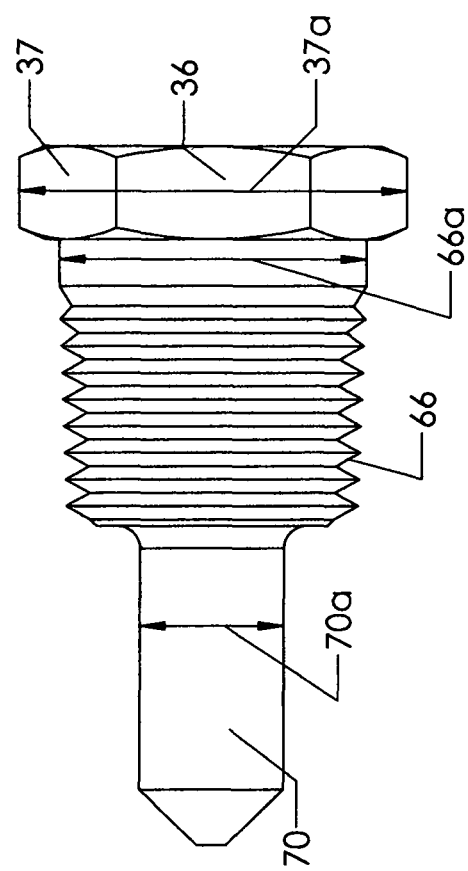
FIG. 5 is a side view of the fastener of FIG. 4.

FIG. 5 is a side view of the fastener 36 of FIG. 4.

FIG. 6 is a plan view of the draw and return tubes 14 and 16 of FIG. 1 taken along line 6A-6A of FIG. 7, the tubes unsecured to a securement structure or to a flange.

FIG. 7 is a side view of the draw and return tubes 14 and 16 of FIG. 1 with the tubes disconnected from flange 24 and from securement structure 12. As shown in this figure, tubes 14 and 16 each include a slight bend in the tubes at a region 15 which allows the tubes to be placed in a cylindrical fuel tank 20 without end regions 40 and 42 contacting the inner surface 32 of the fuel tank. Additionally, tubes 14 and 16 are shown without a second bend in their end regions 40 and 42 because spacing of the fuel tube draw aperture and the fuel tube return aperture is accomplished by use of tube 34 and not by bending of the end of tubes 14 and 16 themselves, as in the prior art. Accordingly, the manufacturing process of tubes 14 and 16 is less time consuming and less labor intensive than the process of manufacturing draw and return tubes of the prior art.

Figure 9:
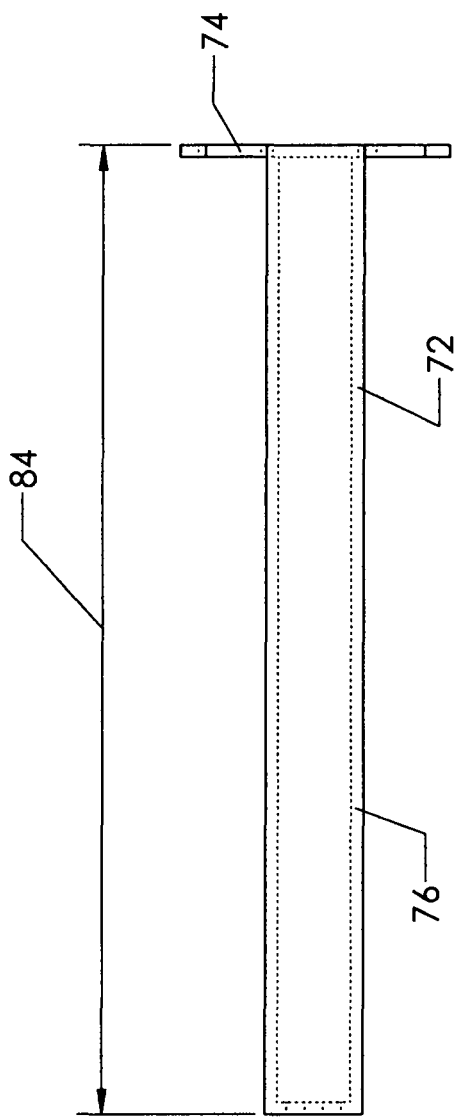
FIG. 9 is a bottom view of the tube support of FIG. 8.
Figure 10:
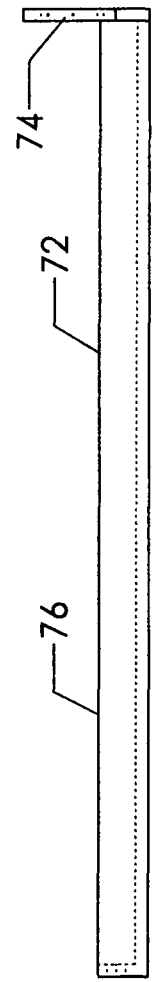
FIG. 10 is a side view of the tube support of FIG. 8.
Figure 8:
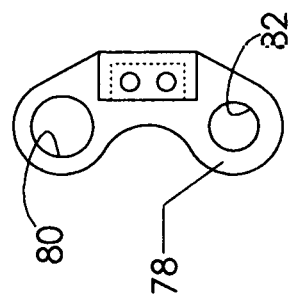
FIG. 8 is an end view of one example embodiment of a tube support.

FIGS. 8, 9 and 10 are an end view, a bottom view, and a side view, respectively, of one example embodiment of a tube support 72. (FIGS. 9 and 10 show the tube support 72 with a stabilization 78 disconnected from an elongate member 76, whereas FIG. 1 shows the tube support 72 connected to the stabilization plate 78.) Tube support 72 may include a base 74 that is secured to upper surface 22 of fuel tank 20 (FIG. 1). Support 72 may further include an elongate member 76 that extends from base 74 to a stabilization plate 78. Plate 78 may include a first aperture 80 sized to receive draw tube 14 (FIG. 1) there through, and a second aperture 82 sized to receive return tube 16 (FIG. 1) there through. A length 84 of elongate member 76 is sized such that when base 72 is secured to upper surface 22 of fuel tank 20, stabilization plate 78 is positioned at approximately the mid point of tubes 14 and 16 between the upper and lower surfaces 22 and 32 of fuel tank 20 (FIG. 1), and extends downwardly from flange 24 (FIG. 1) at least one third a length of fuel tubes 14 and 16. In this manner, tube support 72, together with securement structure 12, both provide stability and reduce movement and vibration of tubes 14 and 16 within tank 20 during motion of a vehicle on which fuel tank 20 is mounted.

Tube support 72, draw and return tubes 14 and 16, and securement structure 12, may be placed within fuel tank 20 through an aperture 94 (FIG. 1) within upper surface 22 of fuel tank 20 such that additional apertures need not be formed in fuel tank 20. In one embodiment, tube support 72 and draw and return tubes 14 and 16 may be secured to flange 22, and securement structure 12 may be secured to the lower region 40 and 42 of tubes 14 and 16. The flange may then be secured to fuel tank 20 such that tube support 72, tubes 14 and 16, and securement structure 12, are all positioned within the interior 30 of fuel tank 20. Fastener 36 may then be placed through drain aperture 38 of the fuel tank to secure securement structure 12 in place. In this manner the assembly 10 may be secured within fuel tank 20 as an after market device, without requiring forming additional apertures within the fuel tank.

Figure 11:
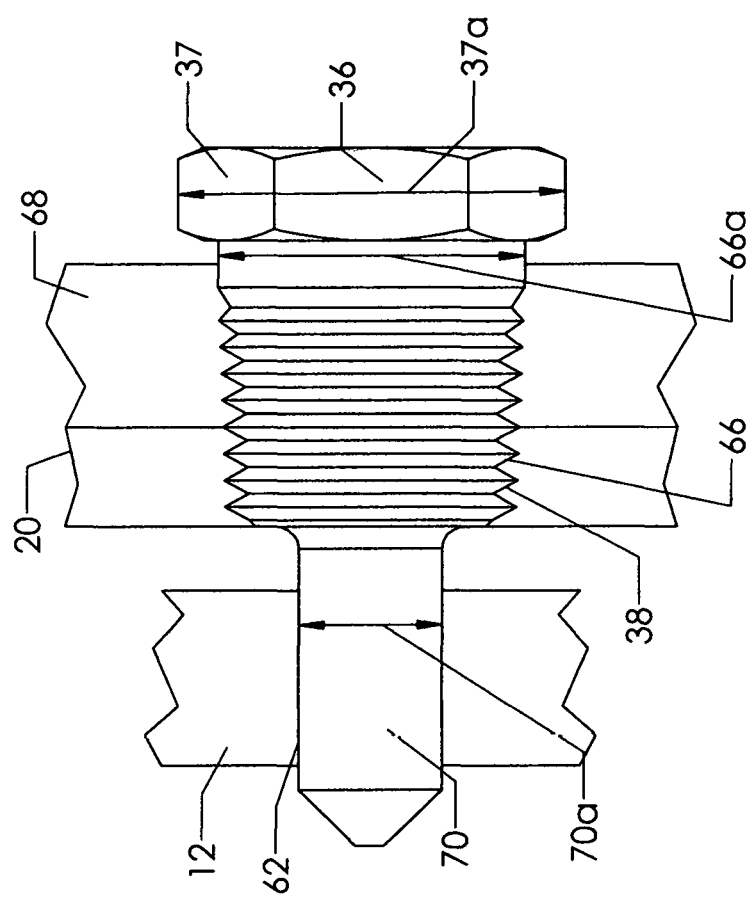
FIG. 11 is a detailed cross sectional view of the fastener of FIG. 1 positioned in the fuel tank drain aperture.

FIG. 11 is a detailed cross sectional view of the fastener 36 of FIG. 1 positioned in the fuel tank drain aperture 38 of the fuel tank.

As may be understood from the above description and drawings, the present invention has many advantages over prior art fuel tank assemblies.

In the above description numerous details have been set forth in order to provide a more through understanding of the present invention. It will be obvious, however, to one skilled in the art that the present invention may be practiced using other equivalent designs.

I claim:

1. A method of securing fuel tubes in a fuel tank, comprising:
   providing a tube support member;
   securing a first tube end of a first fuel tube to a flange;
   securing a first tube end of a second fuel tube to said flange;

securing a second tube end of said first fuel tube to said tube support member;

securing a second tube end of said second fuel tube to said tube support member;

placing said tube support member and said second tube end of said first and second fuel tubes through a first fuel tank aperture of a fuel tank;

securing said flange to said fuel tank at said fuel tank aperture; and placing a fastener through a second fuel tank aperture of said fuel tank and into said tube support member to secure said tube support member to said fuel tank at said second fuel tank aperture.

2. A method according to claim 1 wherein said tube support member includes a first end region, a second end region positioned opposite said tube support member from said first end region, and a central region positioned there between, said central region including a first member aperture, a second member aperture and a third member aperture positioned between said first and second member apertures, said elongate member including a first fluid flow path communicating with said first member aperture and said first end region and a second fluid flow path communicating with said second member aperture and said second end region, wherein said first fuel tube is secured within said first member aperture, said second fuel tube is secured within said second member aperture, and said fastener is secured within said third member aperture.

3. A method according to claim 1 further comprising, prior to securing said second tube end of said first fuel tube to said tube support member and prior to securing said second tube end of said second fuel tube to said tube support member, placing said second end of said first fuel tube through a first aperture of a support bracket, placing said second end of said second fuel tube through a second aperture of a support bracket, and securing a first end of said support bracket to said flange, wherein said support bracket defines a length from said support bracket first end to said first and second apertures of said support bracket and wherein said support bracket length is at least one third of a length of each of said first and second fuel tubes.

4. A method of securing fuel tubes in a fuel tank, comprising:

providing a tube support member having a first tube connector, a second tube connector, and an attachment device;

securing a first end of a first fuel tube to a flange and a second end of said first fuel tube to said first tube connector of said tube support member;

securing a first end of a second fuel tube to said flange and a second end of said second fuel tube to said second tube connector of said tube support member;

placing said tube support member and said second end of said first and second fuel tubes through a first fuel tank aperture of a fuel tank;

securing said flange to said fuel tank at said fuel tank aperture; and placing a fastener through a second fuel tank aperture of said fuel tank and into said attachment device of said tube support member to secure said tube support member to said fuel tank at said second fuel tank aperture.

5. The method of claim 4 wherein said first fuel tank aperture and said second fuel tank aperture are positioned opposite said fuel tank from one another.

6. The method of claim 4 wherein said attachment device of said tube support member comprises an internally threaded recess, said fastener includes external threads thereon, and wherein said fastener is secured to said tube support member by threading said fastener into said internally threaded recess of said tube support member.

7. The method of claim 4 wherein said second fuel tank aperture is a drain aperture of said fuel tank.

8. The method of claim 4 wherein said step of placing a fastener through a second fuel tank aperture of said fuel tank and into said attachment device of said tube support member to secure said tube support member to said fuel tank at said second fuel tank aperture reduces vibration of said first and second fuel tubes with respect to said fuel tank during movement of said fuel tank.

9. The method of claim 4 wherein said step of securing said fastener to said tube support member comprises manipulating a first end of said fastener positioned on an exterior of said fuel tank to secure a second end of said fastener to said tube support member, wherein said second end of said fastener and said tube support member are both positioned in an interior of said fuel tank.

10. The method of claim 9 wherein an installer securing said fastener to said tube support member contacts only said second end of said fastener positioned exterior of said fuel tank.

11. The method of claim 4 wherein said first aperture is sized to allow placing said tube support member, and said second end of said first and second fuel tubes fixedly secured thereto, through said first fuel tank aperture of said fuel tank.

12. A method of reducing vibration of fuel tubes positioned within a fuel tank, comprising:

providing an elongate member having a lower end of a first tube connected thereto, a lower end of a second tube connected thereto, and an attachment structure;

placing said elongate member through a first aperture of a fuel tank such that said lower end of said first tube, said lower end of said second tube and said attachment structure are all positioned within an interior of said fuel tank;

manipulating an upper end of at least one of said first and second tubes on an exterior of said fuel tank to position said attachment structure adjacent a second aperture of said fuel tank; and manipulating a first end of a fastener from an exterior of said fuel tank such that a second end of said fastener extends through said second aperture of said fuel tank and fastens to said attachment structure of said elongate member to secure said elongate member to said fuel tank at said second aperture, thereby reducing vibration of said first and second tubes positioned within said fuel tank.

13. The method of claim 12 wherein said elongate member is secured to said fuel tank by contacting said fuel tubes and said fastener only on an exterior of said fuel tank.

14. The method of claim 12 wherein said lower ends of said first and second tubes are secured against vibration within said fuel tank by said elongate member.

* * * * *